United States Patent [19]

Bright

[11] 3,927,773
[45] Dec. 23, 1975

[54] LOAD STORAGE SYSTEM AND APPARATUS THEREFOR

[76] Inventor: Thomas John Robert Bright, 270 Sandridge Road, Rockcliffe, Ontario, Canada

[22] Filed: May 21, 1974

[21] Appl. No.: 472,055

Related U.S. Application Data

[63] Continuation of Ser. No. 263,765, June 19, 1972, abandoned.

[52] U.S. Cl. ... 214/16.4 C; 214/16 B; 214/16.1 CD; 214/16.1 DB
[51] Int. Cl.² ........................................ B65G 47/00
[58] Field of Search ........ 214/16 B, 16.4 A, 16.4 B, 214/16.4 R, 16.1 CD, 16.1 DB, 16.4 C

[56] References Cited
UNITED STATES PATENTS

| | | | |
|---|---|---|---|
| 1,861,659 | 6/1932 | Fox | 214/16.1 CD |
| 2,095,151 | 10/1937 | O'Connor et al. | 214/16.1 CE |
| 2,712,875 | 7/1955 | Leopold | 214/16.1 CE |
| 3,240,365 | 3/1966 | King | 214/16.4 A |
| 3,405,817 | 10/1968 | Hartbauer et al. | 214/730 X |
| 3,405,817 | 10/1968 | Alimanestianu | 214/16.1 CB |
| 3,557,973 | 1/1971 | Louviers | 214/16 B |
| 3,568,862 | 3/1971 | Essen | 214/16.4 A |
| 3,608,750 | 9/1971 | Young | 214/16.4 A |
| 3,610,445 | 10/1971 | Kitchen | 214/16.4 A |
| 3,719,288 | 3/1973 | Schmitt | 214/16.4 C |
| 3,738,506 | 6/1973 | Cornford | 214/16.4 C |

*Primary Examiner*—Robert J. Spar
*Assistant Examiner*—R. B. Johnson
*Attorney, Agent, or Firm*—DePaoli & O'Brien

[57] ABSTRACT

A load handling storage and retrieval installation having storage units consisting of parallel rows of storage positions extending between service aisles with driven carriages in the service aisles and a captive pallet for each load storage position with lineal and transverse drive means mounted on the driven carriages and control means for said drive means whereby loads may be loaded and unloaded to and from the storage positions in the aisles selectively or in accordance with a selected loading and unloading programme.

1 Claim, 18 Drawing Figures

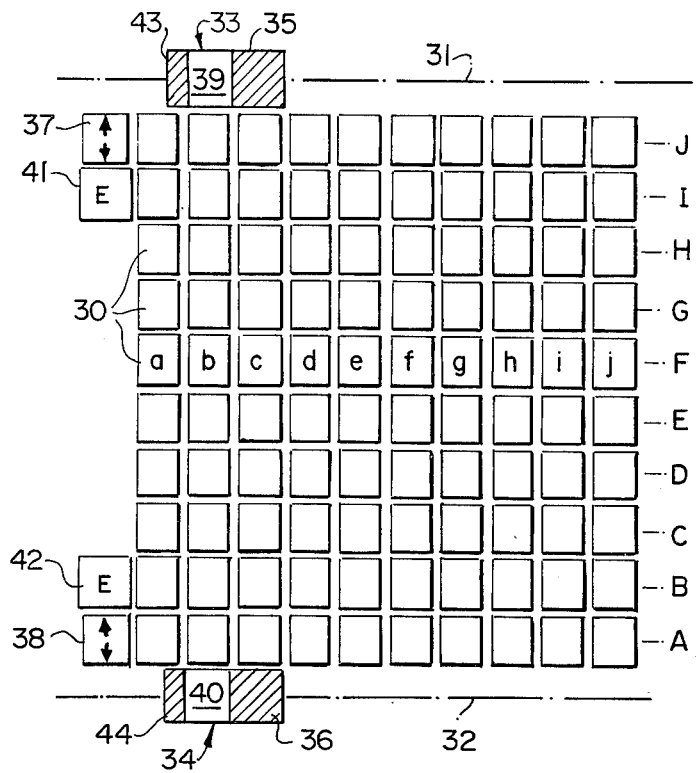
FIG. I
FIG. IV

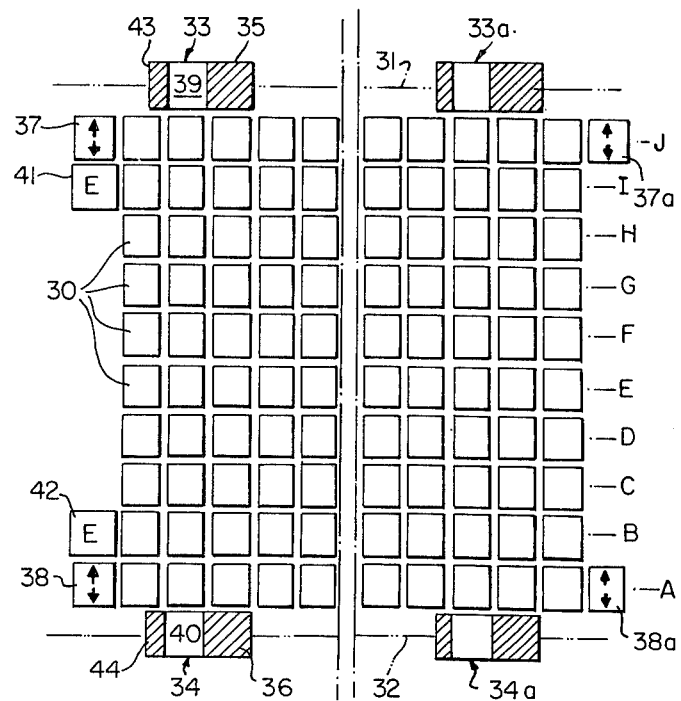
FIG.Ia
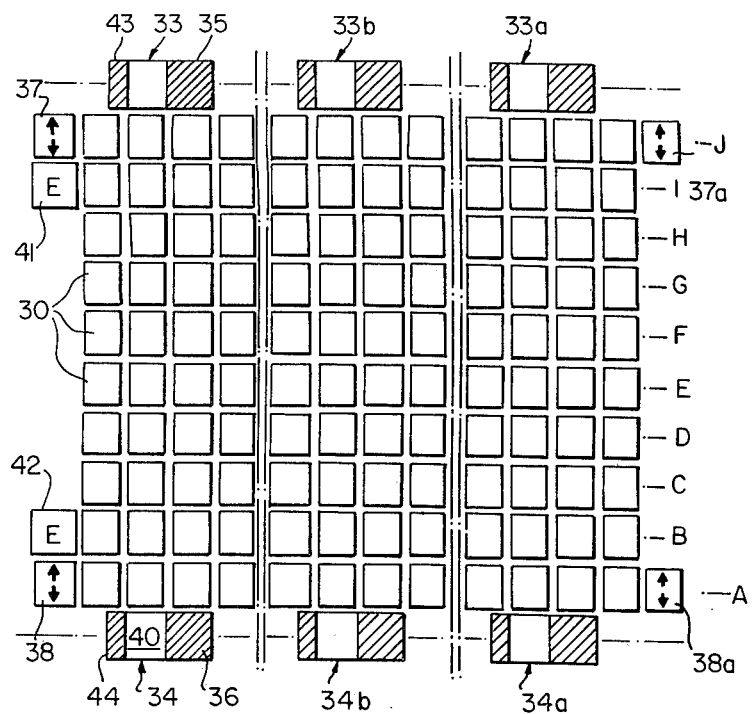
FIG.Ib

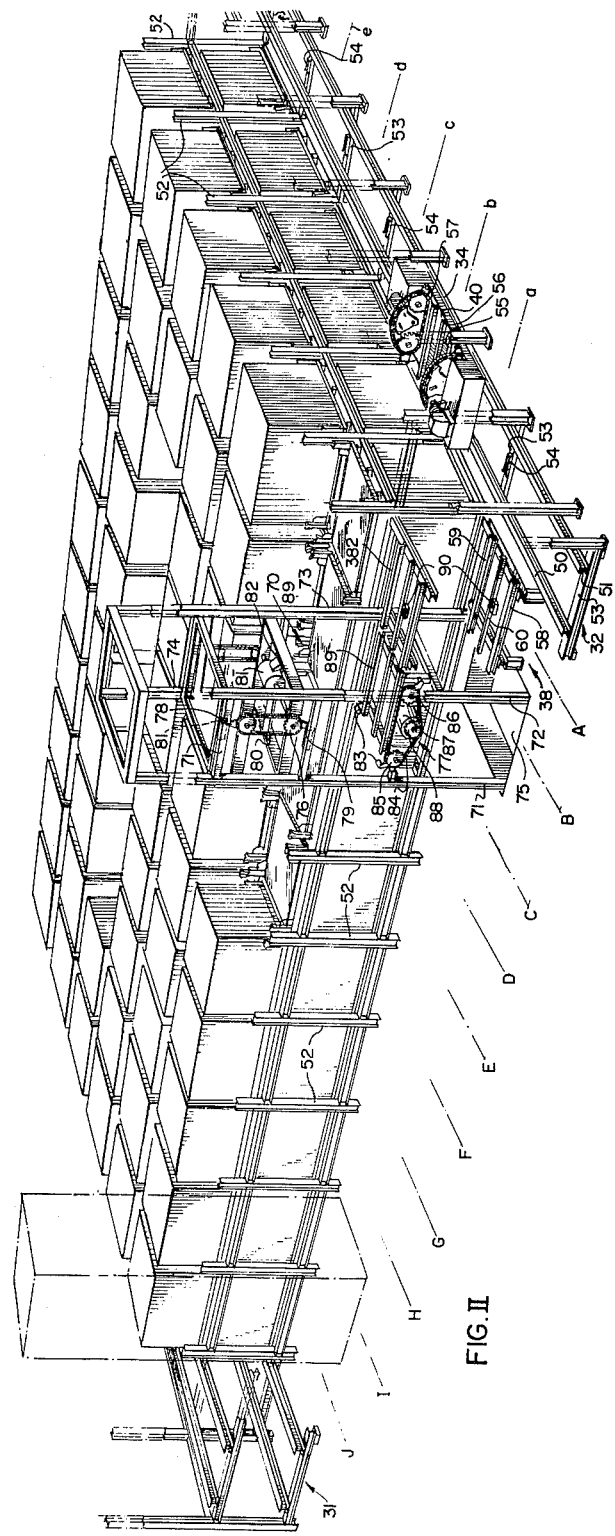
FIG. II

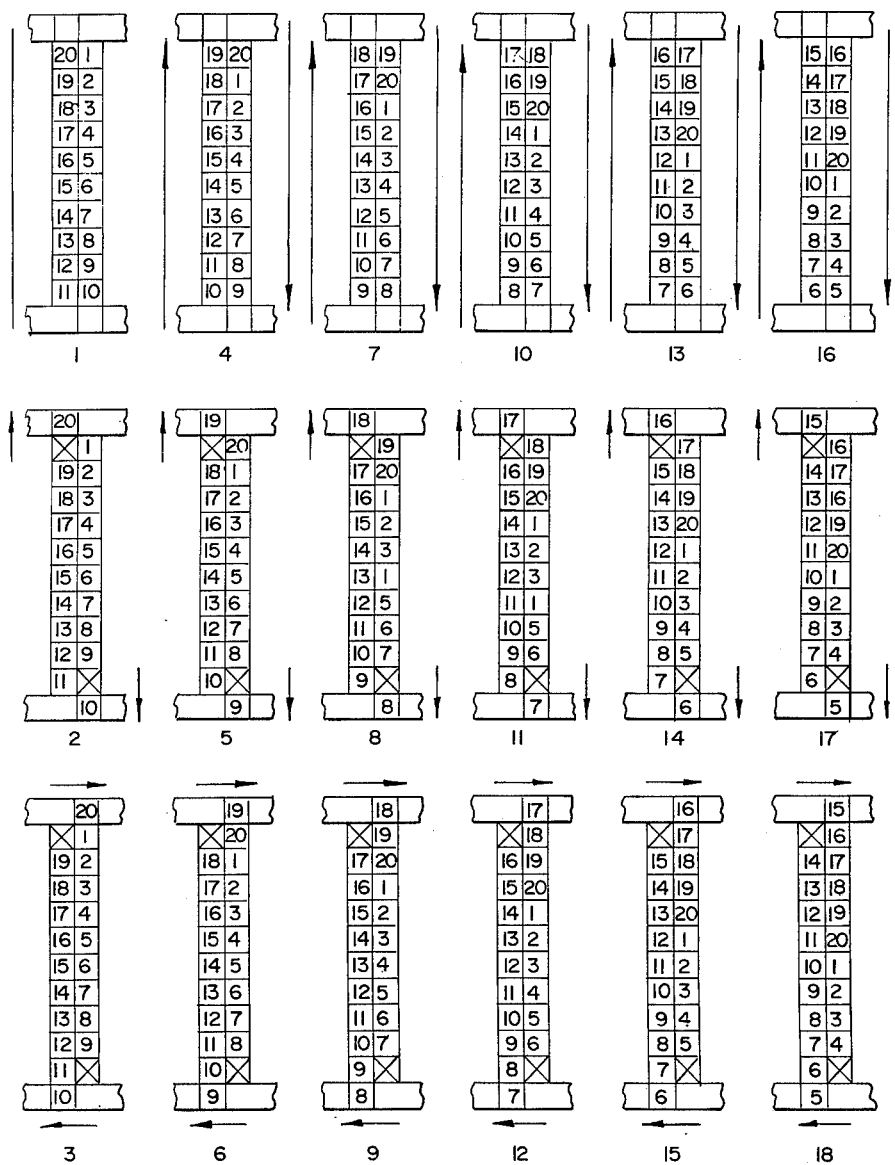
FIG. III.

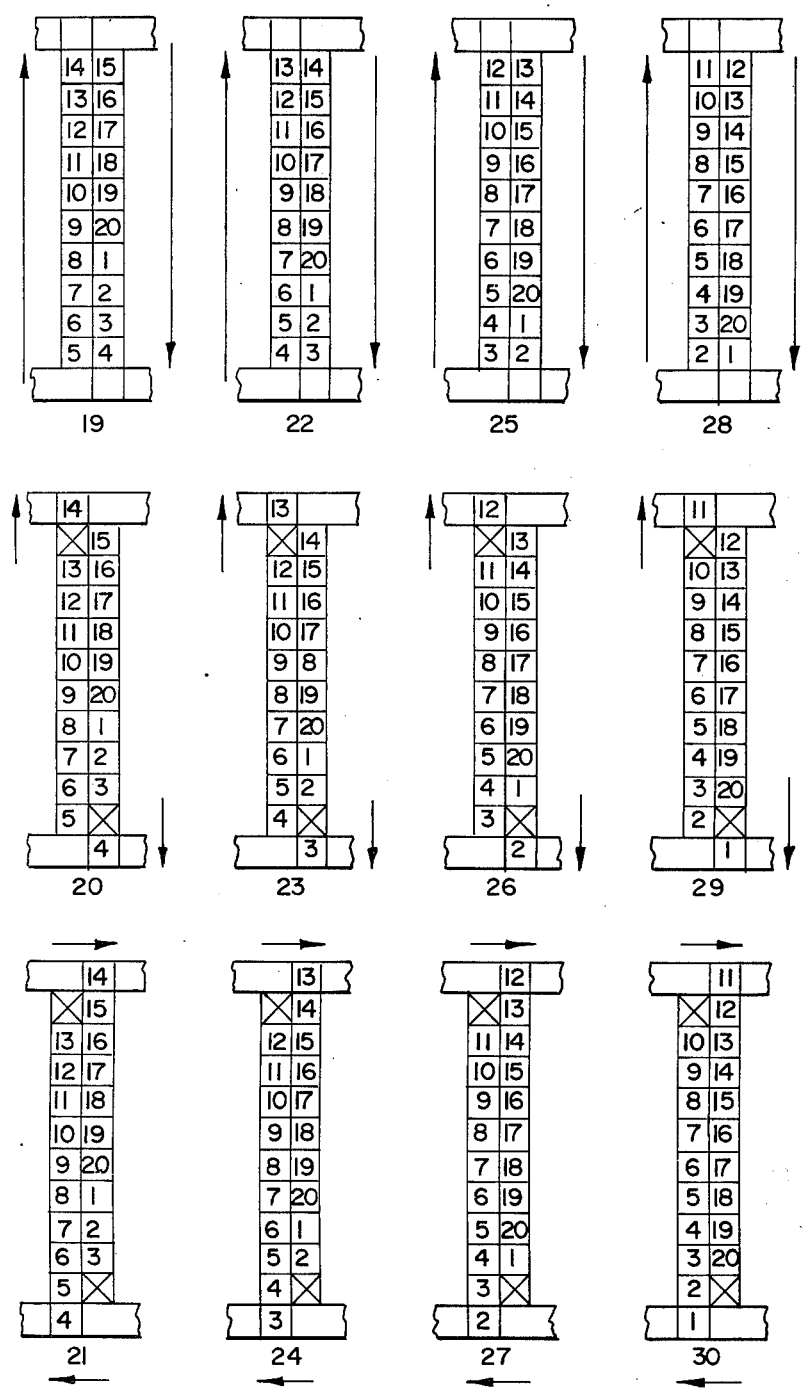
FIG.IIIa.

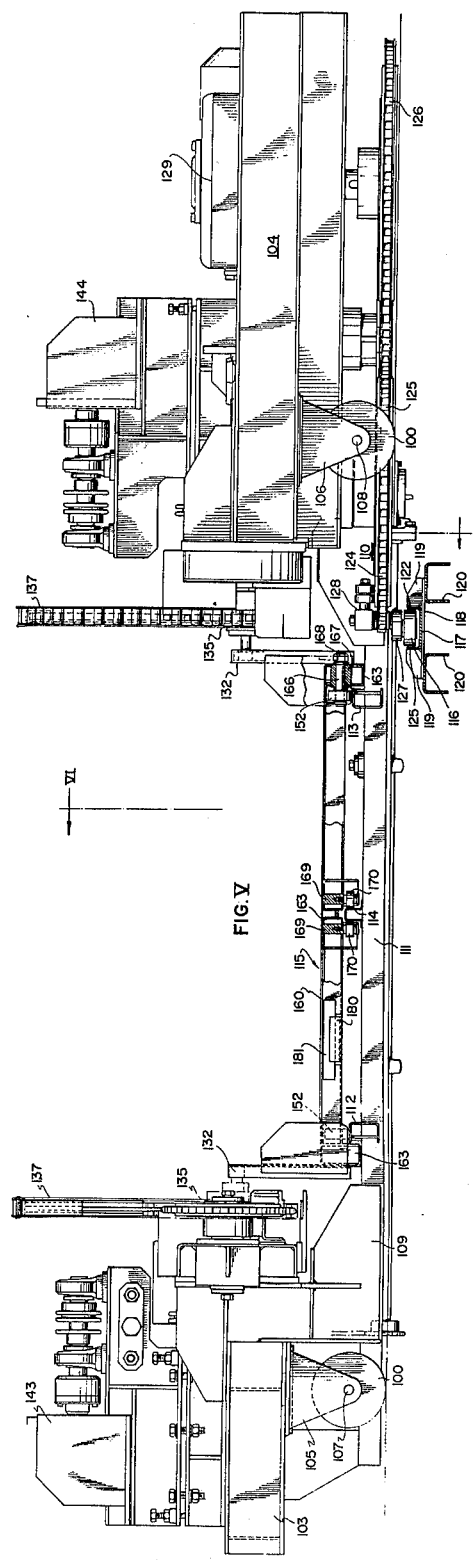
FIG. V

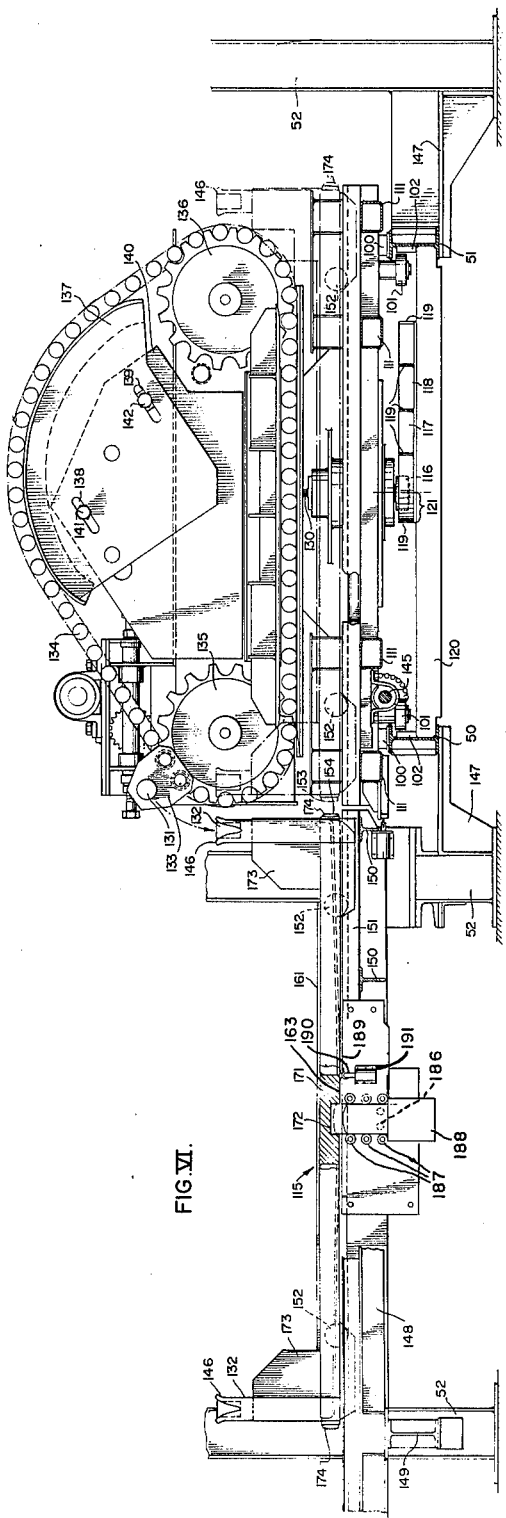

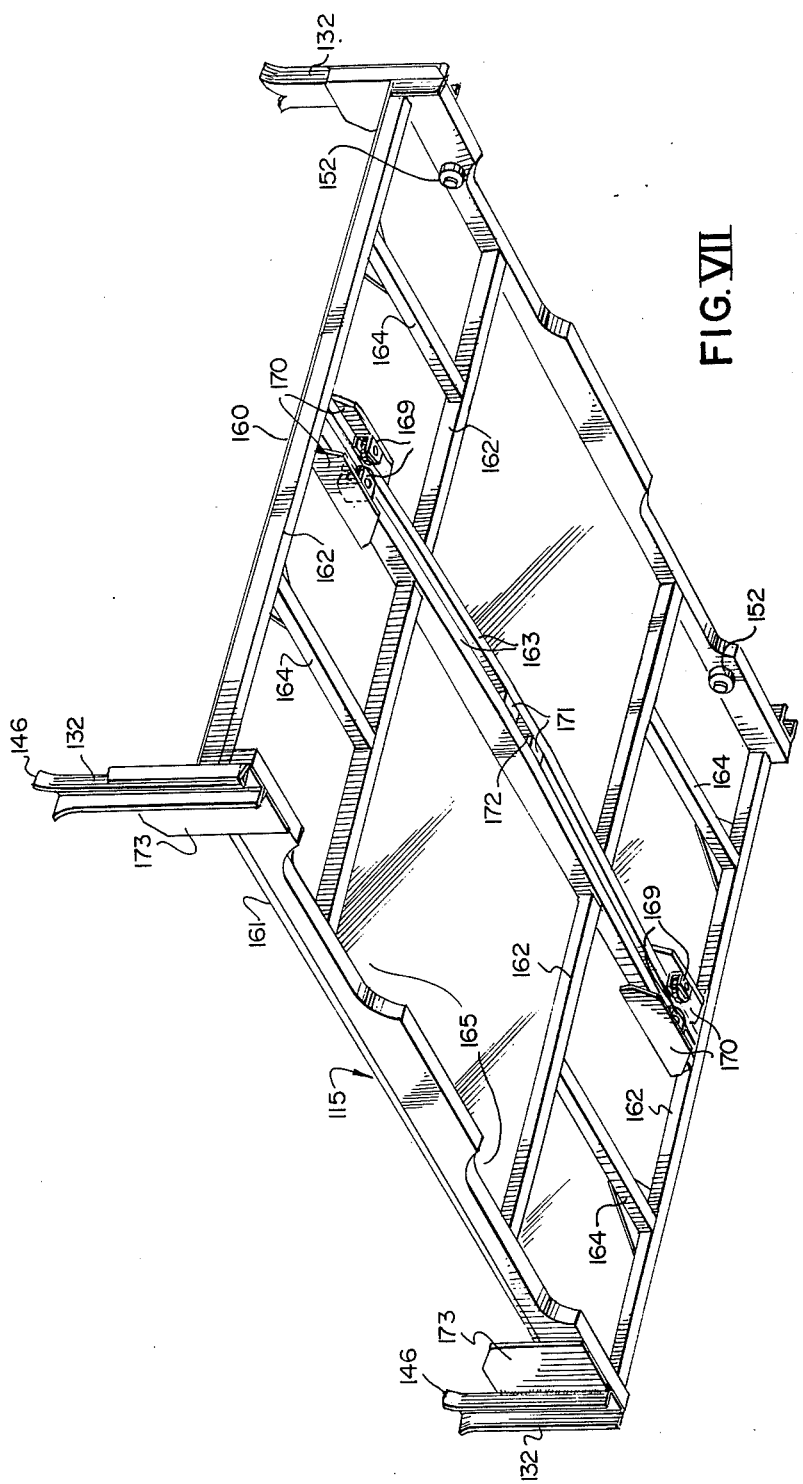

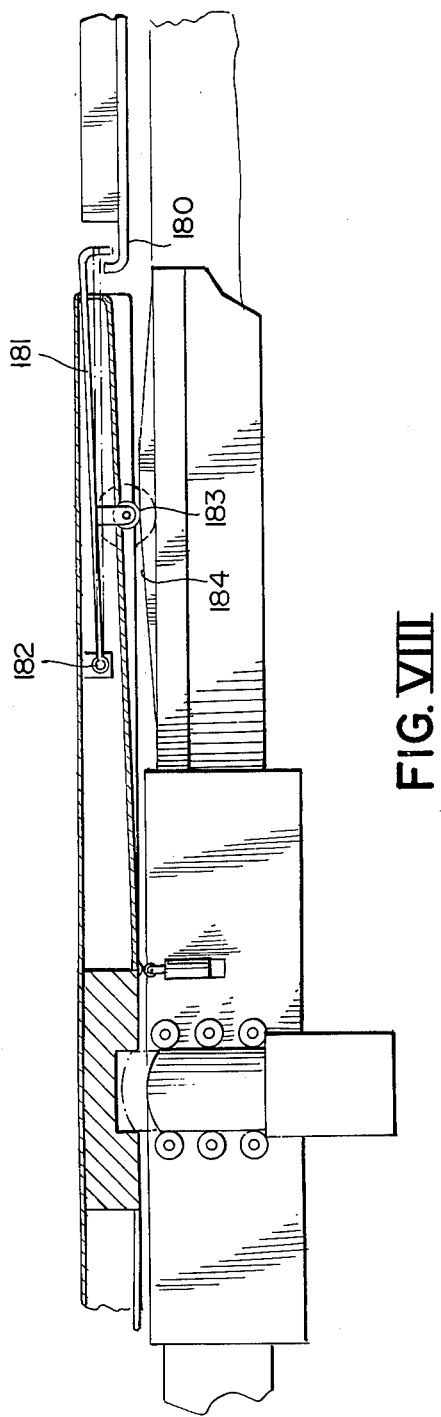
FIG. VIII

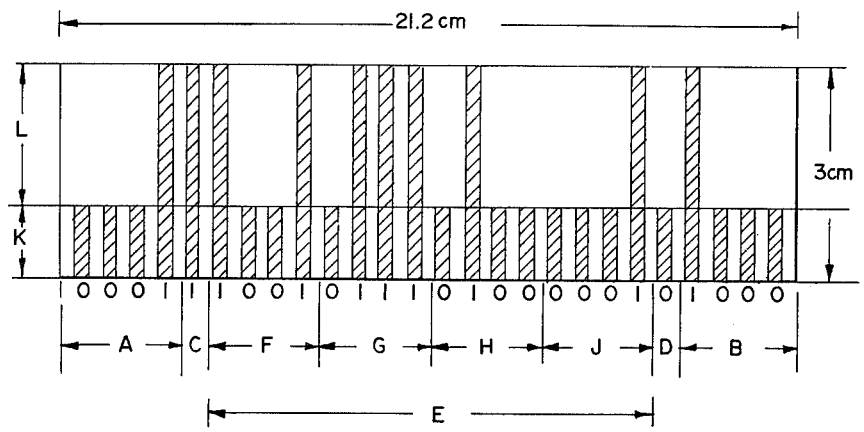
FIG.IX.
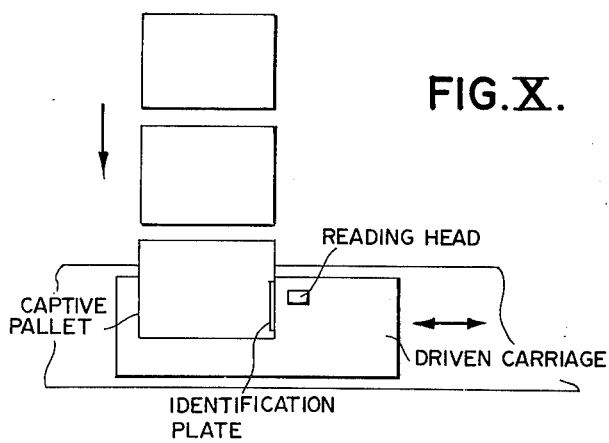
FIG.X.
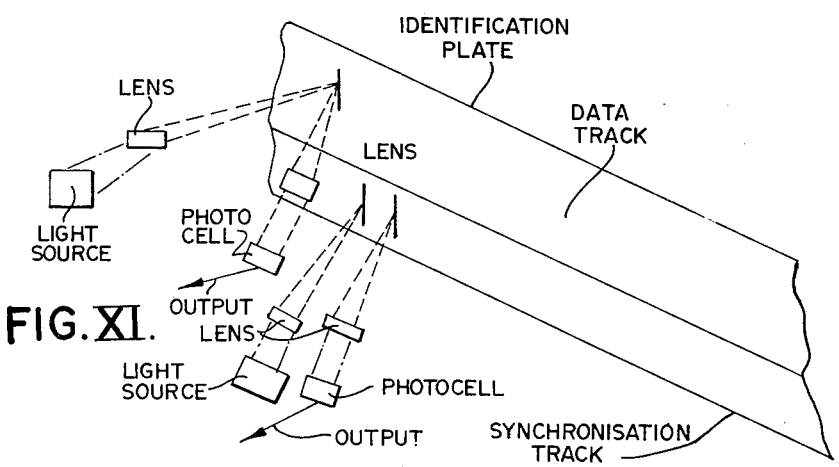
FIG.XI.

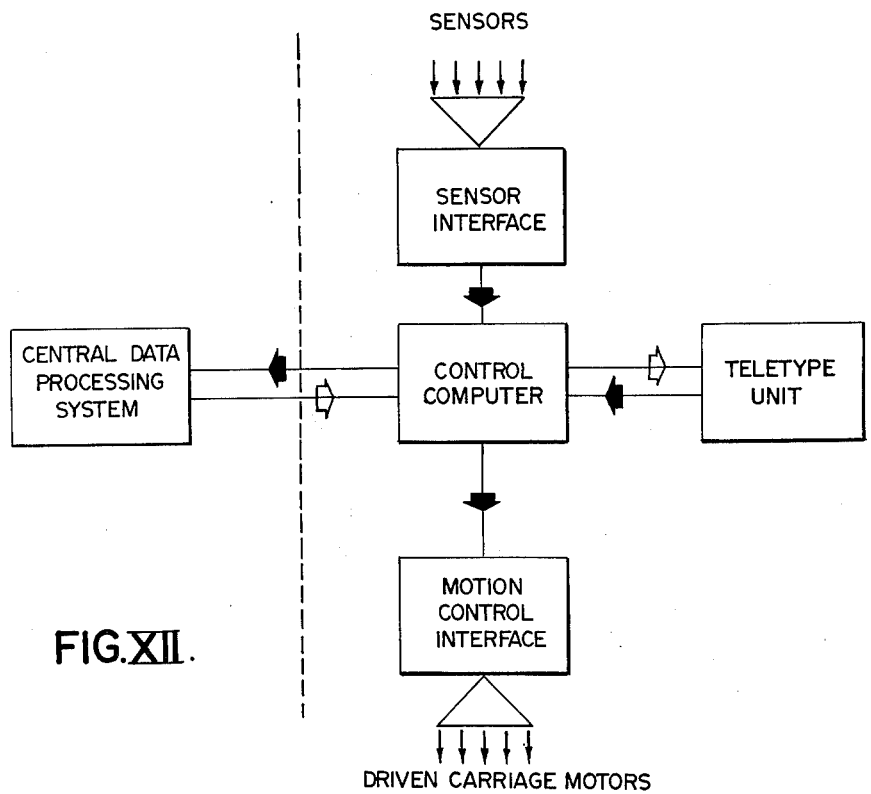
FIG.XII.
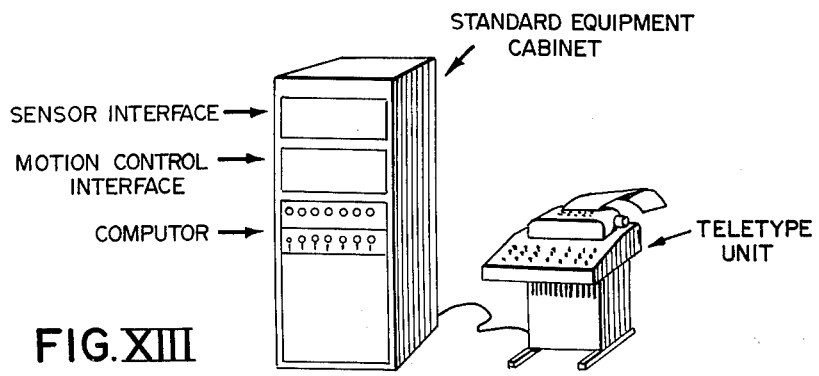
FIG.XIII

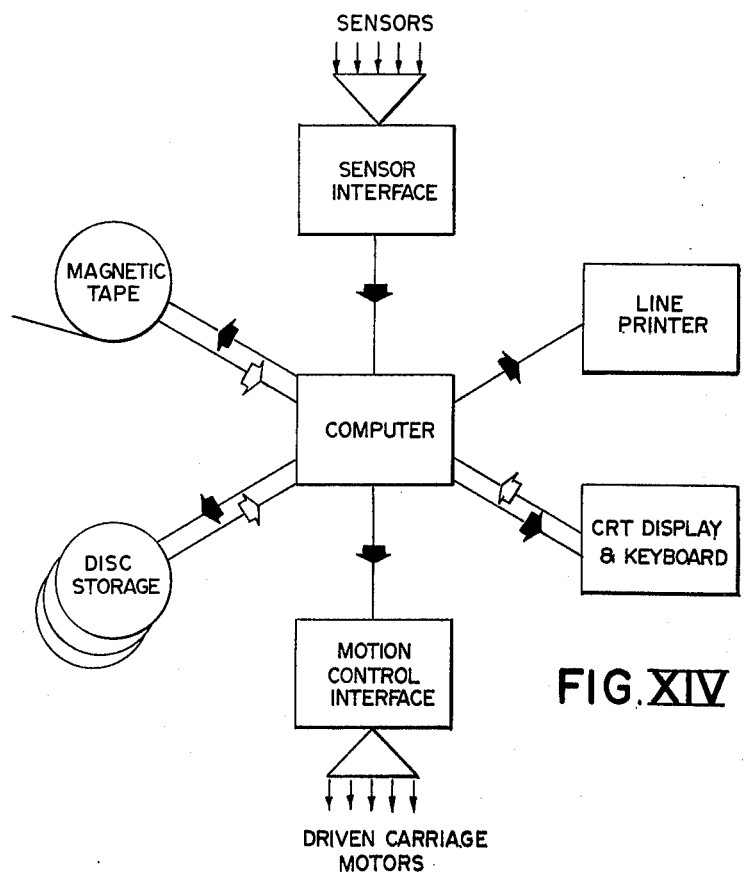
FIG. XIV
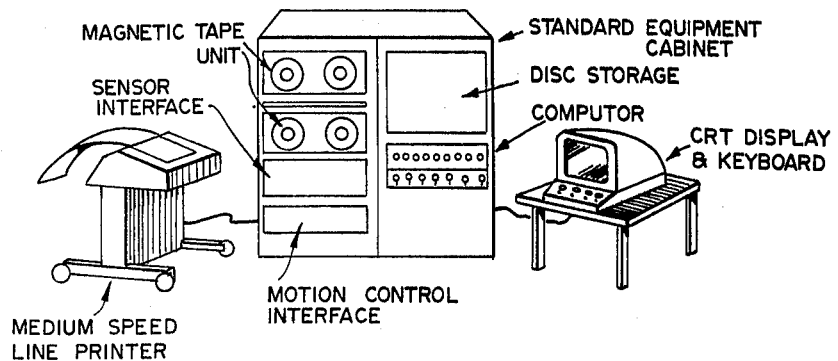
FIG. XV

LOAD STORAGE SYSTEM AND APPARATUS THEREFOR

This is a continuation of application Ser. No. 263,765 filed June 19, 1972, now abandoned.

BACKGROUND OF THE INVENTION

In my prior Canadian Pat. No. 863,734 I describe a load storage installation comprising storage units consisting of two adjacent parallel rows of load storage positions containing shuttle carriers at either end thereof for movement between said rows and a number of movable load supporting platforms totalling three less than the total number of load storage positions and wherein loads carried on load supporting members could be supplied to and withdrawn from such storage units by carriages operating within service aisles positioned at right angles to said rows at either end thereof. In my subsequent Canadian Pat. No. 881,938 I described a mechanism and arrangement whereby the carriages in such service aisles could be moved stepwise into registry with selected rows of said storage units and load carrying members carried by such carriages could be moved transversely into or out of such rows a distance corresponding to the length of one storage position. The present invention provides an improved storage installation wherein loads carried by load supporting members (herein referred to as "captive pallets") may, in a completely selective manner, or in a programmed sequential manner, be stored in and retrieved from any one of a plurality of storage positions within a plurality of parallel rows of storage positions extending between two service aisles having driven carriages therein adapted to transport said captive pallets between the ends of the rows and loading and unloading positions.

SUMMARY OF THE INVENTION

This invention relates to the handling, storage and retrieval of loads and more particularly to installations for the handling, storage and retrieval of unit loads such for instance as palletized goods, shipping containers, automobiles and the like.

In connection with the storage installations of the present invention the loads to be stored are deposited on a captive pallet at a loading station and each load is moved to a storage location and eventually to an unloading station while carried by the captive pallet upon which it is originally deposited. The captive pallets themselves never leave the installation, hence the term "captive pallet".

The captive pallets are identical with each oher and are adapted to receive a load of predetermined standard size i.e. "palletized" wares carried upon a standardized pallet or standard sized shipping containers. In the case of automobiles the captive pallets have a special design adapted to accommodate the normal variation in wheelbase and stance width of the different makes of car. The captive pallets are each provided with anti-friction means such as roller bearings enabling them to move freely along supporting guideways in the storage rows and in the driven carriages which transport them along the service aisles. Each pallet is also provided with means such as channels or camways adapted to cooperate with transverse drive means on the carriages and suitable recesses or protrusions to cooperate with the locking means which is usual within the storage rows.

The captive pallets may also, in certain installations, be provided with coupling means to couple them together train fashion within the storage rows. It is a feature of this invention that there is a captive pallet for every storage position in the installation. There may, in addition, be captive pallets for certain of the carriages in the service aisles as will be hereinafter explained.

According to the present invention, a load handling, storage and retrieval installation comprises at least one storage unit which unit comprises: a plurality of parallel rows of load storage positions extending between two service aisles at right angles thereto, a driven carriage in each of said aisles, and a captive pallet for each of said load storage positions; guideways located in the same horizontal plane in each of said rows and each of said driven carriages for supporting said captive pallets for movement therealong in either direction parallel to said rows; anti-friction means permitting said captive pallets to move freely along said guideways; drive means for driving each of said driven carriages into registry with any selected one of said rows and at least one of said driven carriages to loading and unloading stations situated adjacent at least one end of at least one of said service aisles; driving means mounted on each of said carriages arranged to cooperate with a captive pallet carried thereby or in a storage position adjacent thereto to move the latter a distance along the guideways of said carriage and of said row, equal to the length of one of said load storage position; locking means for each row of load storage positions adapted to restrain at least the captive pallet at each end thereof against movement along the guideways of said row; means for releasing said locking means of a given row in respect to at least the captive pallet at the adjacent end of said row in response to the movement of a driven carriage into registry with said adjacent end of said row; and control means for the drive means for said driven carriages, and the driving means mounted on said driven carriages for imposing thereon a selected program of synchronized sequential movements arranged to insert loads presented at a loading station into storage in said load storage positions and to present loads in said load storage positions at a selected one of said unloading stations for removal from said storage unit.

The control means for the motors driving the driven carriages and the motors on the driven carriages for imparting movement to the captive pallets along the storage rows are preferably such as to be capable of actuation by computer so that the number, sequence, and sense of the motor operations necessary to accomplish the movement of any particular captive pallet from its position of storage to an unloading or loading station and vice versa may be commanded by a program stored in the memory of the computer selected on the basis of the particular load carried by the particular captive pallet or on the basis of a predetermined loading or unloading sequence.

It is contemplated that a running inventory of loads correlated with pallet positions will also be maintained in the computer memory so that there is present in the memory at all times a record of the position of each pallet and the identity of the load, if any, carried by it. This record is subject to read out or to display at the control centre so that a complete indication of the state of loading of the installation and the position of each load is available to the operator at all times.

Since the computer records the identity of the load as the latter enters the installation and co-relates it with the identity of the captive pallet on which it is carried, it is possible for the operator to select the appropriate program for the movement of any particular load to a designated unloading station simply by feeding in to the computer the identity of the load e.g. on a dial or keyboard. When there is more than one loading station the feed in will designate a desired loading station.

During loading operations the feed in will include a command selecting a program for the presentation of a carriage with an empty captive pallet at a designated loading station.

The nature of the wares stored and the nature of the demand for unloading of stored wares will, in any given case, determine the nature and variety of the repertoire of programs for loading and unloading which are made available to the operator of a particular installation.

For instance, if the installation is a parking garage, complete selectivity for all storage positions would be desirable, and there should always be an empty captive pallet at the loading station as long as the installation is not full. It will also be desirable to load those positions closest to the unloading stations preferentially.

If the wares to be stored are uniform wares of limited shelf life where selectivity of withdrawal is not important, the selection of loaded captive pallets for unloading can be made a function of the computer to be made automatically on a first in - first out basis. Where shelf life is unlimited, unloading can be made automatic on the basis of closest available to the unloading station. Various combinations of the foregoing programs may be used for different blocks of the installation.

Furthermore, if picking is a part of the operation to be carried on in association with the installation, one or more loaded captive pallets may be presented for temporary access in a picking aisle located adjacent to but outside the storage unit of the invention.

Where the installation is to be used for shipping containers at a dockside area loading and unloading may be on a unit weight basis correlated with the loading manifest of the ship to produce the proper trim of the ship as loading proceeds and in the fully loaded vessel. Advantageously an installation according to the invention can be incorporated in a container ship to permit loading and unloading and adjustment of trim at intermediate ports.

The invention and its operation will be more fully understood from the following detailed specification taken in conjunction with the accompanying drawings which illustrate a load storage and retrieval installation having a plurality of superposed storage units of 100 storage positions, the installation being intended to accommodate palletized goods carried by pallets of a standard size. The installation described is given by way of illustration only, since it will be obvious that identical principles will apply to installations designed to accommodate different types and sizes of load such as shipping containers and automobiles, or different numbers of storage positions.

BRIEF DESCRIPTION OF THE DRAWINGS

In the drawings:

FIG. I is a diagrammatic plan layout of a storage unit having 100 storage positions.

FIG. Ia is a diagrammatic plan lay-out similar to FIG. I showing the use of two driven carriages in each service aisle. FIG. Ib is a diagrammatic plan lay-out similar to that in FIG. I illustrating the use of three driven carriages in each service aisle.

FIG. II is a projection, partially diagrammatic, and partly cut away of a storage installation containing a plurality of superposed storage units like that illustrated in FIG. I.

FIG. III and FIG. IIIA is a diagrammatic plan view of two adjacent rows of storage positions and the driven carriages in service aisles at the ends of said rows illustrating the sequence of movements according to one series of programmes for selective withdrawal of pallets where there is one captive pallet for each storage position.

FIG. IV is a diagrammatic plan view of two adjacent rows of storage positions and the driven carriages in service aisles at the ends of said rows illustrating the sequence of movements according to another series of programmes for selective withdrawal of pallets where there is one captive pallet for each storage position, and a captive pallet for one of said driven carriages.

FIG. V is a side elevation, partly in section and partly cut away of a driven carriage in a service aisle and a captive pallet carried thereby.

FIG. VI is an elevation partly in section and partly cut away of the driven carriage of FIG. V taken at right angles to the elevation of FIG. V along the section VI—VI thereof and showing partly in section and partly cut away, a captive pallet in a storage position adjacent the driven carriage in a row of storage positions with which the driven carriage is in register.

FIG. VII is a projection taken from below of a captive pallet.

FIG. VIII is a fragmentary side elevation taken showing the locking mechanism and a coupling mechanism for coupling and uncoupling adjacent captive pallets.

FIG. IX is a diagrammatic illustration of a "pallet identification plate" used in the system of the present invention.

FIG. X is a plan view showing the positioning of the identification plate and the data sensing device.

FIG. XI illustrates a decoding system for the signals received from the sensing device.

FIG. XII illustrates a control layout for computer control of inventory and operation of a storage installation according to the invention.

FIG. XIII illustrates the physical appearance of the main elements of the control system illustrated in FIG. XII.

FIG. XIV illustrates another control layout for a storage installation according to the invention, and FIG. XV illustrates the physical appearance of the principle elements of the layout shown in FIG. XIV.

DESCRIPTION OF PREFERRED EMBODIMENTS

Referring now more particularly to the drawings, a storage installation according to the invention consists of one or more storage units which may be superposed within a building structure to give a multi-floor installation of the kind illustrated in FIG. II. Each storage unit consists of a plurality of parallel rows of storage positions extending between service aisles running at right angles to the rows and provided with driven carriage members which are adapted to move into registry with any of the rows or with loading or unloading positions located on extensions at either end of said aisles. There may be any number of rows and the rows may each contain any desired number of storage positions.

The storage units of the installation depicted in FIG. II are illustrated diagrammatically in plan view in FIG. I. As illustrated there are 10 rows $a, b, c, d, e, f, g, h, i, j$, each containing ten storage positions, each being depicted by a block such as that indicated by numeral 30. There are thus 100 storage positions 30 in the unit illustrated. The rows $a$–$j$ inclusive run between service aisles indicated by centre lines 31 and 32 which accommodate the driven carriages 33 and 34 respectively. The driven carriages 33 and 34 are provided with mechanism (herein referred to as lineal drive mechanism) respectively mounted in the portions 35 and 36 thereof for moving the driven carriages along the respective aisles 31 and 32 into registry with any one of the rows a–j inclusive or into unloading or loading positions in registry with loading and unloading platforms 37 and 38.

Each of the storage positions corresponding to the blocks 30 is occupied by a captive pallet (details of which will be described later) which is capable of carrying a palletized or containerized load and which is capable of being moved along the length of the rows on guideways or rails (which will be described later), or onto the load carrying portions 39 and 40 of the driven carriages 33 and 34 respectively, or onto the platforms 37 and 38 or the elevators 41 and 42. The mechanism (herein referred to as its transverse drive mechanism) for moving the captive pallets along the rows a–j inclusive and onto the on and off portions 39 and 40 of the driven carriages 35 and 36 and on and off the platforms 37 and 38 is carried on the portions 39 and 40 of the driven carriages 33 and 34. This mechanism, which will be described in detail later, is capable of moving a captive pallet from a position on the load carrying space 39 or 40 into an adjacent storage position 30 of a row with which the driven carriage is in register or onto a platform 37 or 38 which the driven carriage happens to be in register and is also capable of moving a captive pallet from the position at the adjacent end of any row with which the driven carriage is in register, or on a platform 37 or 38, onto the driven carriage. The mechanism is sufficiently powerful that it can move all of the captive pallets in a given row either by pulling them if the pallets are coupled together or by pushing them with a pallet which is being moved off the driven carriage. The captive pallets may be moved onto the elevators 41 and 42 from platforms 37 and 38 and vice versa by a mechanism (to be described later) which is carried by the elevator.

It is essential for the proper functioning of the storage unit according to the invention that the centres of rows a, b, c, d, e, f, g, h, i and j be equidistant and that the distance between the centre lines of the platforms 37 and 38 and that of the adjacent row a be the same as the distance between the centres of two adjacent rows. It is also essential that the captive pallets be identical in size within reasonable tolerances and that the centre line of the load carrying positions 39 and 40 which are parallel to the centre lines 31 and 32 of the service aisles be spaced within reasonable tolerances exactly one pallet length from the corresponding centre lines of the storage positions adjacent the service aisles and the centre lines of platforms 37 and 38. The mechanism for moving the driven carriages 33 and 34 along the respective service aisles 31 and 32 is arranged to operate so as to move the driven carriages step-wise in steps which correspond exactly to the distances between centre lines of the rows from a position of registry with one row into a position of registry with another or with a platform 37 or 38 as the case may be. Similarly the mechanism for moving the captive pallets from the carrying positions 39 and 40 on the driven carriages into adjacent storage positions on platforms 37 and 38 is arranged to move the captive pallets in a transverse direction a distance corresponding exactly within reasonable tolerances to the length of a pallet. The mechanism of driven carriages 33 and 34 can be made to operate simultaneously in the same or opposite directions or may be made to operate independently of each other.

It will be appreciated from the foregoing that a captive pallet occupying any of the squares 30 which lie adjacent the aisles 31 or 32 may be transferred onto the pallet carrying positions 39 or 40 of a driven carriage 33 or 34, driven by the said driven carriage to a position in register with a platform 37 or 38 and then transferred onto such platform 37 or 38.

The functioning of the two drive mechanisms on each of the driven carriages 33 and 34 is controlled from a control centre in accordance with preselected programmes whereby the necessary sequence of step-wise operations are performed by the drive mechanisms to perform any particular loading or unloading operation.

Thus, from the position indicated in FIG. I, to move the captive pallet occupying position 30b on to the platform 38 will require the following step-wise movements of the mechanism of driven carriage 36. (Directions refer to direction on the drawing)

| movement number | drive mechanism | direction |
|---|---|---|
| 1 | transverse | down |
| 2 | lineal | left (b to a) |
| 3 | lineal | left (a to 38) |
| 4 | transverse | up |

Suppose a load has now been placed on the captive pallet, and it is desired to transfer it to storage position 30b for storage, the sequence is the reverse as follows:

| movement number | drive mechanism | direction |
|---|---|---|
| 1 | transverse | down |
| 2 | lineal | right (38 to a) |
| 3 | lineal | right (a to b) |
| 4 | transverse | up |

If it is now desired to place a load in position 30i the sequence will be as follows:

| movement number | drive mechanism | direction |
|---|---|---|
| 1 | lineal | right (b-c) |
| 2 | lineal | right (c-d) |
| 3 | lineal | right (d-e) |
| 4 | lineal | right (e-f) |
| 5 | lineal | right (f-g) |
| 6 | lineal | right (g-h) |
| 7 | lineal | right (h-i) |
| 8 | transverse | down |
| 9 | lineal | left (i-h) |
| 10 | lineal | left (h-g) |
| 11 | lineal | left (g-f) |
| 12 | lineal | left (f-e) |
| 13 | lineal | left (e-d) |
| 14 | lineal | left (d-c) |
| 15 | lineal | left (c-b) |
| 16 | lineal | left (b-a) |
| 17 | lineal | left (a-38) |
| 18 | transverse | up |
| hiatus while load being placed on captive pallet | | |
| 19 | transverse | down |
| 20 | lineal | right (38-a) |
| 21 | lineal | right (a-b) |
| 22 | lineal | right (b-c) |
| 23 | lineal | right (c-d) |
| 24 | lineal | right (d-e) |
| 25 | lineal | right (e-f) |
| 26 | lineal | right (f-g) |
| 27 | lineal | right (g-h) |
| 28 | lineal | right (h-i) |
| 29 | transverse | up |

Obviously programmes can be written in analogous manner for the movement of any captive pallet in tier A to platform 38 and return and for the movement of any pallet in tier J to platform 37 and return. Similarly constructed programmes could be written for movement of any of the captive pallets in tiers A and J to and from loading or unloading platforms situated at the right hand end of the aisles 31 and 32.

Programmes of the above type are sufficient to carry out all of the operations required to load and unload the captive pallets in tiers A and J (i.e. the tiers next the service aisles) where there is one captive pallet for each storage positions and no more. For the carrying out of such programmes the mechanisms of each driven carriage can operate independently.

In order to load and unload captive pallets in tiers B, C, D, E, F, G, H, and I and in the case where there is an additional captive pallet (notionally assigned to the load carrying position of a driven carriage), it is necessary to coordinate the programming of both the driven carriages 33 and 34.

The manner of this coordination will be apparent from a consideration of the programme necessary to remove a load carried by the captive pallet in a randomly selected storage position — say tier H of row b.

In order to do this it is apparent that it is necessary to move the selected captive pallet to the storage position of its row adjacent the service aisle which services the unloading platform through which it is desired to remove the load. (Suppose the load is to be removed via platform 37). This is done by using the coordinated movement of both driven carriages to circulate the captive pallets of row b with those of another row (usually, but not necessarily one or other of the adjacent rows, a or c). A suitable programme is as follows:

| movement number | drive carriage | mechanism | direction |
|---|---|---|---|
| 1 | 34 | lineal | left (b-a) |
| 2 | (33 | transverse | up |
|   | (34 | transverse | down |
| 3 | (33 | lineal | left (b-a) |
|   | (34 | lineal | right (a-b) |
| 4 | (33 | transverse | down |
|   | (34 | transverse | up |
| 5 | (33 | lineal | right (a-b) |
|   | (34 | lineal | left (b-a) |
| 6 | (33 | transverse | up |
|   | (34 | transverse | down |
| 7 | (33 | lineal | left (b-a) |
|   | (34 | lineal | right (a-b) |
| 8 | (33 | transverse | down |
|   | (34 | transverse | up |
| 9 | 33 | lineal | right (a-b) |
| 10 | 33 | lineal | left (b-a) |
| 11 | 33 | lineal | left (a-37) |
| 12 | 33 | transverse | down |
|   | Hiatus while load removed | | |
| 13 | 33 | transverse | up |
| 14 | 33 | lineal | right (37-a) |
| 15 | 33 | lineal | right (a-b) |
| 16 | 33 | transverse | down |

It will be seen that movement 1 sets up the positional relationship of the driven carriages which will enable the captive pallets in rows a and b to be circulated anti-clockwise in movements 2–8 until after movement 8 the selected pallet (H of row b) is adjacent service aisle 31. From there on the driven carriage 35 acts independently to pick up the loaded captive pallet from the aisle position in row b, present it to platform 37 for unloading, and return it to its aisle position in row b.

The circulating movement of the rows can be either anti-clockwise or clock-wise. If the rows being circulated are not adjacent, the number of movements required is increased and hence so is the total time required for the circulatory movement. Hence it is usually advantageous that the circulated rows be adjacent.

The sequence of movements for circulating two adjacent rows in clock-wise direction is shwon in FIG. III and IIIA. Each captive pallet in the two rows is given a number from one to 20 and the direction of movement is in each case indicated by the arrows. The empty storate positions adjacent the service aisles resulting from withdrawal of pallets onto the driven carriages are marked X. A similar programme can be written for the removal of the load from any captive pallet in any row and tier via any loading or unloading platform.

It will be appreciated that it is possible to compile and store, e.g. in the memory of a computer, a programme for the unloading of each of the load storage positions in the unit via platform 37. If there are other platforms e.g. 38 through which unloading is to take place each storage position may have a programme for each unloading position intended to be used.

If the stored position of each load is known, the presentation of a particular load at a selected unloading position may be accomplished simply by selecting the appropriate programme for the particular storage position occupied by the captive pallet carrying the selected load.

The storage position occupied by a particular load at any given time depends upon the loading and unloading programs which have been adopted for the storage unit. Since each movement of the lineal mechanism places the driven carriage in registry with particular known row (or loading and unloading platform) and since each movement of the transverse mechanism moves a captive pallet either into or out of a tier adjacent the service aisle, and moves any captive pallets pushed or pulled by such pallet into the next tier, the position of each load at all times, and the position of the empty captive pallets is derivable from the programs fed into the mechanism controls by means of standard logic circuitry which maintains the position of all empty captive pallets and loads in a temporary memory working with a permanent memory on which the inventory of the unit is kept. In this fashion a read-out of the state of loading of the unit and the identity of each load in it is available to the operator at all times enabling him to command an unloading programme for any designated load upon demand. Such read-out, in indicating the positions of empty captive pallets, enables the operator to select a programme for the bringing of an empty captive pallet to the loading platform on the basis of which one is closest in terms of total numbers of moves.

If the unit is to be operated on the basis of selective unloading, as above explained, it will be desirable to provide for return of empty captive pallets to a position where they are readily available to the loading platform. Thus, referring to FIG. I, if all loading is to be done via platform 38, and all unloading through platform 37, it will be desirable to use row a for the return of empty captive pallets from tier J to tier A and to keep it free of loads unless the other nine rows are fully loaded.

According to this plan row b would be the first row loaded, and rows b, c, d, e, f, g, h, i and j would each be successively filled before row a is filled. The empty captive pallets would be picked up from row a by driven carriage 34, and loaded. The empty captive pallets received by driven carriage 33 upon insertion of a load in a row being loaded would be inserted into row a to replace the one picked up by carrier 34, those in tiers B–J each being moved down one tier by such insertion.

When unloading of a selected pallet takes place, in order to avoid unnecessary circulation of captive pallets in obtaining empty captive pallets for loading it is desirable that the empty pallet be inserted by driven carriage 33 in the nearest partially loaded row, and that the loaded pallet which results on driven carriage 34 be inserted in the row from which the unloaded captive pallet was withdrawn by driven carriage 33. This will result in the tendency to maintain as many completely loaded rows as possible.

Another mode of operation is possible where there is a captive pallet for one of the driven carriages 33 and 34.

In this case the circulation of captive pallets in two adjacent rows is illustrated in FIG. IV ((1) – (4)), the captive pallet notionally assigned to a driven carriage being marked XC.

Assuming the empty captive pallet is on driven carriage 34, the loading programme to insert a load in row b would be as follows starting from the position shown in FIG. I.

| movement number | driven carriage | mechanism | direction |
|---|---|---|---|
| 1 | 34 | lineal | left (b-a) |
| 2 | 34 | lineal | left (a-38) |
| 3 | 34 | transverse | up |
| hiatus while load being placed on captive pallet | | | |
| 4 | 34 | transverse | down |
| 5 | 34 | lineal | right (38-a) |
| 6 | 34 | lineal | right (a-b) |
| 7 | (34 | transverse | up |
|   | (33 | transverse | up |

This leaves a captive pallet on driven carriage 33.

Assuming it is now desired to insert another load in row b, the programme would be as follows (where empty captive pallets are to be picked up from row (a)).

| movement number | driven carriage | mechanism | direction |
|---|---|---|---|
| 1 | (33 | lineal | left (b-a) |
|   | (34 | lineal | left (b-a) |
| 2 | (33 | transverse | down |
|   | (34 | transverse | down |
| 3 | 34 | lineal | left (a-38) |
| 4 | 34 | transverse | up |
| hiatus while load being placed on captive pallet | | | |
| 5 | 34 | transverse | down |
| 6 | 34 | lineal | right (38-a) |
| 7 | (33 | lineal | right (a-b) |
|   | (34 | lineal | right (a-b) |
| 8 | (33 | transverse | up |
|   | (34 | transverse | up | leaving a captive pallet on driven carriage 33.

This system of operation has the advantage of giving one extra storage space (on a driven carriage) per storage unit, and slightly more versatility in loading programs available by virtue of the fact that the captive pallet carried by the driven carriage can be inserted in any row rather than having to be returned to the row from which it came. It has the disadvantage, however, of requiring the coordination of both driven carriages for a higher percentage of operations.

In larger installations where the service aisles are long it may be desirable to have more than one driven carriage in each service aisle as shown in FIGS. Ia and Ib. If there is a loading and unloading platform at each end of an aisle it can be advantageous to have one driven carriage for each loading and unloading platform. In this case, of course, it is necessary to mesh the programme of the lineal mechanisms to that the two driven carriages do not attempt to occupy the same position at the same time. It may also be necessary (depending on the physical configurations of the driven carriages) to lengthen the service aisles by the distance between centres of two adjacent rows in order to enable each driven carriage in a service aisle to move into register with the row most remote from its loading and unloading platform.

Under certain conditions of operation and in some layouts it may be desirable to have as many as three driven carriages per service aisle as shown in FIG. Ib, and to use one carriage (33b and 34b) in each aisle exclusively in circulating captive pallets within the rows. Such a system would be advantageous in situations involving simultaneous loading and unloading where sorting is to be carried out as the wares pass through the installation such, for instance, as in the loading of ships according to a particular loading manifest or the sorting of freight for different destinations.

The physical layout of an installation comprising several superposed storage units of the type illustrated in FIG. I is shown in FIG. II.

The driven carriage 34 can be seen riding on rails 50, 51 in service aisle 32 with the pallet carrying position 40 thereon in register with row b. The supporting columns 52 are based on the concrete foundation and are spaced in the direction of the service aisle on centres spaced apart the distance between centres of adjacent rows a–g. This distance must allow for the passage between adjacent columns of the captive pallets and the pusher means of the transverse mechanism of the driven carriages. The spacing of the columns 52 along the rows is based on centres spaced apart the distance between centres of adjacent storage positions in a row. This distance will correspond exactly (within allowable tolerances) with the length of a captive pallet if the latter are not provided with coupling means, or with the distance between centres of two coupled captive pallets if these are provided with coupling means.

The rails 50, 51 are supported upon steel joists 53 which are secured to the columns 52. Each joist 53 carries an upwardly facing channel member 54 for cooperation with the lineal drive mechanism of the driven carriage 34 (in a manner to be explained). The load carrying position 40 of the driven carriage 34 has the captive pallet supporting rails 55, 56 and the guide rail 57 corresponding to captive pallet supporting rails 58, 59 and guide rail 60 of loading and unloading platform 38 and to similar captive pallet supporting rails and guide rails (not visible in FIG. II) in each of rows a–j inclusive, all of which lie in the same horizontal plane.

As shown, the loading and unloading platform is in fixed position. This is for simplicity of description. In practice it is desirable to have the loading platform 38 and its counterparts (e.g. 37) capable of movement from the position shown to a position outside the building structure and back, so that during loading of a load on the captive pallet carried thereby there is unlimited overhead clearance. This can easily be accomplished by mounting the platform on a suitable shuttle carrier equipped with wheels on suitable rails and with suitable drive means.

On the side of platform 38 remote from the service aisle 32 is the elevator 70 riding in the shaft defined by frame uprights 71, 72, 73, 74, which are bedded in elevator pit 75.

The elevator itself is the analogue of a driven carriage such as 34, having a mechanism 76 for raising and lowering the elevator (corresponding to the lineal drive mechanism) and a mechanism 77 for moving a captive pallet off or onto platform 38 or its counterpart 382 on the second "floor" and other counterparts (not visible on FIG. II) on higher "floors".

As shown, the elevator is registered with the platform 382 of the second floor. It has been brought into such register and is held there by the engagement of the pushers 78, 79 mounted on driven chain 80 with the channel members 81, 82 mounted on elevator frame uprights 71, 72 which are spaced on centres corresponding with the distance between the horizontal plane of the captive pallet storage positions on successive floors. The chain 80 (and its counterpart in the mechanism on the other side of the elevator and which is not visible in FIG. II) is driven by motor 81 mounted on mounting 82 above and clear of the load space of the elevator.

The transverse mechanism 77 of the elevator comprises the pushers 83 mounted on chains 84 riding on sprockets 85, 86 and driven by motor 87 through drive sprocket 88. The pushers 83 engage the upright channel members of the captive pallets in exactly the same manner as those of the driven carriages 33, 34 except for the fact that they enter the channels from below rather than above.

The controls for the motors of the mechanisms of the elevator are similar to those for the motors of the mechanisms of the driven carriages. One movement of mechanism 76 moves the elevator up or down from registry with one loading and unloading platform 38 into registry with another on the next floor up or down as the case may be. One movement of the mechanism 77 withdraws a captive pallet from a platform 38, 382, etc. on to the elevator platform 89 or moves a captive pallet from elevator platform 89 onto a platform 38, 382, etc.

The platforms 38, 382, etc. are each provided with a locking mechanism 90, which locks a captive pallet in position thereon. Such locking mechanism is preferably solenoid operated and arranged to unlock whenever a driven carriage or the elevator platform 89 moves into registry therewith. The locking mechanism 90 cooperates with the same locking recess in the bottom of the captive pallets as do the locking mechanisms in the end storage position of the rows a–g which are described later.

The captive pallets are held in position on the elevator platform by the pushers 83 which are in engagement with the channels of the captive pallets, the pushers being stopped in the position shown by means of limit switches (not shown) controlling the power to motor 87.

The weight of the elevator and its associated mechanisms is balanced by a suitable counterweight (not shown) which rides up and down outside the frame uprights 71 and 74 on the side of the elevator remote from the platforms 38, 382, etc.

The loading and unloading platform 37 and its associated elevator (not visible in FIG. II) and structure are similar in construction to what has been described above in relation to loading and unloading platform 38.

The driven carriages of the installation are illustrated in FIGS. V and VI. They ride on wheels 100 supported on rails 50, 51 and are kept in alignment by guide rollers 101 which bear against guide plates 102 secured to the webs of the rails 50 and 51, there being one pair of guide rollers 101 for each pair of wheels 100. Each driven carriage has a chassis of welded steel construction including girder portions 103 and 104 on which are anchored the wheel mountings 106 and 106 providing support for the axles 107 and 108. The flanged web members 109 and 110 are welded respectively to the girder portions 103 and 104 and are also welded to the four box girders 111 which support the transverse rails 112 and 113 and the transverse guide rail 114 which form the carrying platform for the captive pallet 115 shown in position thereon in FIG. V. It will be observed that the structure thus far described is designed with a view to maintaining at a minimum the vertical space between the top of the rails 50, 51 on which the driven carriage rides and the top of the rails 112 and 113 on the driven carriage and upon which the captive pallets are supported, thus keeping to a minimum the vertical space required between successive floors of an installation.

The lineal drive of the driven carriage along rails 50, 51 is effected by engagement of the pusher 116 in the channel members 117 one of which is shown in FIGS. V and VI. It will be appreciated that there is a channel member 117 for each position of register into which the driven carriage is to move, the space between the channel members 117 being exactly the same as the distance between the centres of said positions of registry. As illustrated in FIGS. V and VI, the channel members 117 are mounted on the plates 118 provided with the stiffening fillets 119. The plates 118 are welded to a pair of channel sections 120 which are welded at either end to the rails 50, 51. In FIGS. V and VI the pusher is shown positioned at dead centre position. The left hand end 121 of the channel member 117 as it appears in FIG. VI has legs 122, 123 spread apart to form a bell mouth to ease the entry into the channel of the pusher 116.

The pusher 116 is mounted on an endless chain 124 carried by sprockets 125 and 126 and chain 124 carries a second pusher member (not shown) so positioned as to occupy the opposite dead centre position to that occupied by the pusher 116 when the latter is in the position shown in FIGS. V and VI.

The chain 124 is preferably a Reynolds chain and the pusher 116 is preferably a ball race mounted on the block 127 and secured to links in the chain 124 by a standard Reynolds chain mounting device 128, details of which will be familiar to those skilled in the art. The sprocket 125 is an idler sprocket while the sprocket 126 is driven by motor 129 through shaft 130. In the embodiment illustrated the motor 129 is an hydraulic motor driven by hydraulic fluid under pressure from a source powered by an electric motor (not shown). It will be appreciated however, that the motor 129 could equally well be a conventional electric motor driving shaft 130 through a suitable reduction gear, or a disc type electric motor with direct drive and preferably self-braking. The use of hydraulic motors enables a wide selection of speeds of operation and lends itself to accurate position control and determination of horse power requirements for various speeds of operation but in practice it is contemplated that standard electric motors or disc motors will be employed in particular installations where the particular motor design will be selected having regard to the size of the loads to be handled and the speeds of operation required.

The transverse mechanism moves the captive pallets transversely by engagement of the pushers 131 in the vertical channels 132 of the captive pallets 115 (see FIG. VI). The pushers 131 are secured to mountings 133 which are in turn secured to the Reynolds chains 134 which are mounted on the drive sprockets 135, idler sprocket 136 and ride around the chain stretcher 137 which consists of a plate having the diagonal slots 138 and 139 which is secured to the fixed vertical plate 140 by bolts 141 and 142. Each of the drive sprockets 135 is driven through a suitable drive mechanism (not visible) by hydraulic motors 143 and 144 respectively which are supplied with hydraulic fluid under pressure from the same source as is motor 129. The drives of motors 143 and 144 are mechanically synchronized by the shaft 145 which effects mechanical connection between the two drives so that the pushers 131 of the mechanism on each side of a captive pallet 115 are always in alignment with each other.

As will be observed from FIG. VI the mounting of the pushers 131 is such that the centres of the sprockets 135 and 136 are at the same level as the upper extremities of the upright channel members 132 of a captive pallet carried by the driven carriage or within a row of storage positions. Actually the channel members 132 extend upwardly a short distance above the dead centre position and are flared outwardly as indicated at 146 in order to assist entry of the pusher 131 into the top ends of the channel members 132 to allow for slight variations in the position of stored captive pallets permitted by the dimensional tolerances adhered to. In FIG. VI the position of a captive pallet carried by the driven carriage is indicated in dotted lines while the captive pallet indicated in full lines is shown at the left-hand side of the drawing occupying the adjacent storage position of a row with which the driven carriage is in register.

FIG. VI also illustrates the structure of the installation including the upright columns 52, the supporting brackets 147 for the rails 50, 51 on which the driven carriage rides, horizontal sections 148 supported by spacers 149 which are secured to columns 52 and the cross pieces 150 which support the rails 151 on which the captive pallets are supported upon their ball races 152.

Referring to the pusher 131 as shown in FIG. VI, it will be seen that if the chain 134 is operated in anti-clockwise direction the pushers 131 will enter the adjacent channels 132 of a captive pallet 115 in the adjacent storage position of the row with which the driven carriage is in register as the pusher passes dead centre in relation to drive sprocket 135. As the rotation continues in an anti-clockwise direction the engagement between the pushers 131 and the channels 132 will pull the captive pallet 115 towards and onto the rails 112, 113 of the driven carriage and continuation of the movement will result in the captive pallet 115 ending up in the dotted line position with the pusher 131 in the position shown in dotted lines at the right-hand side of the drawing where it is in dead centre relationship to the idler sprocket 136. If at that point the motion stops the captive pallet 115 is retained in the dotted line position for transportation along the service aisle by the driven carriage. When the driven carriage has been stopped in register with another storage row or loading or unloading platform operation of the chain 134 in the reverse direction will cause the engagement of the pushers 131 and the channels 132 to drive the captive pallet to the left and into the end storage position of the row within which the driven carriage is in register as shown in full lines at the left-hand side of FIG. VI. It is noteworthy that the total throw of the pusher 131 between the two dead centre positions mentioned is somewhat longer than the length of a captive pallet so that when a captive pallet is carried by the driven carriage in positions shown in dotted lines there is clearance between the left-hand end 153 of a captive pallet shown in dotted line position and the right-hand end 154 of a pallet in the end storage position of a row or on a loading or unloading platform.

The structure of the captive pallets themselves is illustrated in FIGS. V, VI, VII and VIII and comprises a load supporting deck 160 which may suitably be of a suitable gauge of sheet steel with its upper edges upturned as at 161 by a small fraction of an inch to restrain any tendencies for a load to shift off the deck 160. The deck 160 is supported by the rectangular tubular sections 162 running transversely and the rectangular tubular sections 163 running longitudinally, the two centrally positioned sections 163 being strengthened by the fillets 164. The sections at the sides of the captive pallet are cut away as at 165 to provide interior access for the mounting of the ball races 152, stub axles 166, and axle housings 167 held in place by retaining nuts 168 (see FIG. V). The guide roller mounting blocks 169 are secured in position in cut away portions of the centre rectangular tubular sections 163 and mounted in suitable taps in the said mounting blocks are the guide ball races 170 (see FIG. V) which operate against the sides of guide rail 114 to keep the captive pallets centered on the rails 112, 113. As is seen from FIG. VII there are two sets of guide ball races, one set being positioned in the centre of the pallet between pairs of ball races 152. In the centre of the captive pallet situated between the two central rectangular tubular sections 163 is the locking recess block 171 (see FIGS. VI and VII) having the downwardly facing locking recess 172. Each corner of the captive pallet carries an outwardly facing channel member 132 which may be braced by a fillet 173 in one direction, as shown in FIG. VII or in both directions as indicated in FIGS. V and VI. The captive pallets may be provided with shock absorbent bumper strips 174 at each end thereof where they are not equipped with coupling means. Where coupling means are present these may take the form of the coupling means illustrated in FIG. VIII which embodies an upwardly directed angle member 180 extending from one end of the captive pallet and a downwardly flanged latch element 181 at the other end of each pallet (see FIGS. V and VIII. The latch member 181 is horizontally pivotted at 182 and carries intermediate its two ends a cam wheel 183 which is adapted to ride on a cam rise 184 to elevate the end of the latch member 181 against the bias of leaf spring 185 to uncouple two adjacent captive pallets. It will be appreciated that the normal position for the latch member 181 will be the lower or coupled position since when a captive pallet carried by a driven carriage moves into register with a row containing a pallet in the adjacent storage position the angle member 180 and the latch member 181 will automatically ride into the engaged position. It is only when a captive pallet in an end storage position of a row is to be withdrawn onto a driven carriage that the coupling means needs to be released. Consequently a cam rise 184 is so positioned in the storage aisles as to raise the latch member 181 which couples the captive pallet in the end storage position to the captive pallet in the position adjacent the end storage position. It will be appreciated that all captive pallets in a given unit will be oriented in the same way and will maintain such orientation throughout operation of the unit. Therefore, at one end of all the storage rows the cam rise 184 will be positioned so as to raise the latch member 181 of the captive pallet in the end storage position whereas at the other end of the storage rows the cam rise 184 will be so positioned as to raise the latch member 181 of the captive pallet in the next to end storage position. Furthermore the position of the cam rise 184 in each case will be such as to cause the latch member 181 to move into its fully up position as the captive pallet moving into the end storage position of a row arrives in the position where its locking recess 172 is engaged by the locking bolt 186.

The locking bolt 186 rides up and down between guide rolls 187 between the upper, or locked position shown in broken lines and the lower, or unlocked position shown in solid lines. The bolt is normally in the locked position, held there by springs (not shown). It is lowered by means of a solenoid 188 against the bias of the springs upon energization of the solenoid. The solenoid 188 is de-energized by cam 189 on the underside of the captive pallet centre section 163 depressing the spring biased plunger 190 of plunger switch 191 mounted on the side of the guide rail 114, so that a captive pallet is locked as it comes into the end storage position of a row. The solenoid 188 is energized by switches (not shown) operated by a driven carriage moving into registry with the adjacent end of the row. Thus a driven pallet in either end storage position of each row will be locked in position at all times unless a driven carriage is in register with the adjacent end of the row. When there is no captive pallet in an end position of a row, as is the case during transport of a captive pallet from a row to the loading or unloading platforms and return, and during circulation in the manner illustrated by FIG. III, the solenoid 188 will be energized, and the locking bolt 186 will be depressed.

As mentioned earlier, the coupling of captive pallets is not essential. If the pallets are to be circulated in accordance with the programme illustrated in FIG. III it is an advantage to have the pallets coupled in order to control deceleration of the end captive pallets (e.g. 19 and 9) as they move into the end storage positions (e.g. in drawing (4) of FIG. III) to avoid shock loads on the locking bolt 186. However, if the captive pallets are to be circulated as indicated in FIG. IV the deceleration of the captive pallets moving into the end storage positions (e.g. consider drawings (2) and (4) of FIG. IV) is controlled by the transverse mechanisms of the two driven carriages which are working in synchronism at opposite ends of the row, and there is never a storage position without a captive pallet during the circulation programme.

It will be appreciated that any form of load may be carried by the platforms and the captive pallets may be used for conveying merchandise, vehicles or any sort of load along the service aisles to an exit point or other storage location from one or both ends of the installation. The installation may be operated by an operator from a control cabin located in suitable position preferably adjacent a loading position and preferably connected to a means of inventory control.

Referring to FIG. XII this represents a system using a simplified Computer, which is capable of handling a large number of pallets. The blocks on the right of the broke line represent the equipment installed by the warehouse. The functions of the computer would be as follows:

1. Storage of information regarding the whereabouts of any particular captive pallet. Each captive pallet has a serial number and each possible location is numbered. These numbers are stored in an automatically updated list in the machine. There is not sufficient storage capability to store inventory information as to contents, but is is necessary to have a record of whether or not any particular captive pallet is empty.

2. Receiving information from the sensor interface. This information will be closure of switch contacts indicating captive pallet motion, and reading of numbers from captive pallet indicating units, etc.

3. Receiving information from the teletype keyboard. This will be directions from the operator to move captive pallets to particular locations.

4. Deciding optimum paths through which the captive pallets should move i.e. clockwise or counter-clockwise in selected pairs of rows, optimum order in which to load or unload a list of several pallets, that is to say, programme selection.

5. Transmitting relevant information to the operator via the teletype keyboard regarding captive pallet locations etc. The operator could type in commands requesting information stored in the computer, which the computer would then type out.

6. Controlling the driven carriage motors by means of signals received from the motion control interface. In addition, a link would be provided to another larger computer installation, which would be part of any particular company's facilities.

A more complex system is shown in FIG. XIV and is capable of maintaining a running inventory and, inter alia, sorting data, as well as performing the functions of the system of FIG. XII. In the system of FIG. XIV the teletype keyboard has been replaced with a CRT display and keyboard device.

This displays information on a television type screen. Large volumes of data can be printed on paper on the line printer at approximately 300 lines per minute. This is about 50 times faster than the teletype keyboard can print.

Other features are disc storage to store the additional information as to pallet contents etc., and magnetic tape storage, so that efficient editing, sorting and recording of data is possible. This system would not be linked to a larger computer as for the system of FIG. XII.

Referring to FIGS. IX to XI, there is shown an arrangement for determining the timing and synchronisation of captive pallets. Each driven carriage is provided with sensing means for scanning data provided on an identification plate attached to each captive pallet. Such an identification plate is shown in FIG. IX and is arranged to be scanned by photoelectric sensing devices e.g. photocells provided on the driven carriage. Each plate is distinctively coded with a binary representation of a decimal number by means of a plurality of reflecting stripes of different lengths. Each captive pallet is allocated a particular numerical designation and each individual storage location is identified by a distinctive numeral. The control computer memory unit is arranged to store the numbers representing the captive pallet positions and the numbers representing the captive pallet identification. As an example column A indicates exemplary captive pallet numbers and column B indicates captive pallet storage locations in the unit.

| A | B |
|---|---|
| 1258 | 0021 |
| 1259 | 4362 |
| 1260 | 1240 |
| 1261 | 2218 |
| 1262 | 1834 |
| 1263 | 5612 |
| 1264 | 4228 |
| 1265 | 1323 |

As indicated above captive pallet No. 1258 is to be found in storage location 0021 and when a captive pallet is moved from one position to another, the entry in column B for that particular captive pallet is stored in the memory of the computer.

Positive captive pallet identification is possible with the system of the present invention. The computer memory will have stored therein data indicative of the number and location of the captive pallet. The reading head on the driven carriage senses the date on the identification plate as it passes the sensing head. If any lack of identity occurs between the data sensed and the data stored, the operator is made aware of the error condition and corrective action initiated.

Referring to FIG. X, the captive pallet identification system operates as follows:

An identification plate is mounted on the side of each captive pallet and a reading device is mounted on the driven carriage such that when a captive pallet passes the reading head, the data is read. On the identification plate, two tracks are provided and the upper and lower tracks are each read by a lamp, line and photocelll combination (FIG. XI). The points at which the light and the photocell are focussed on the plate are directly opposite one another i.e. a line through the lamp and photocell is at 90° to the longitudinal axis of the plate. The lower track is for synchronisation only and consists of alternating black and white stripes or strips, and is designated track K in FIG. IX. The upper track L has information thereon in coded binary form, a white band being indicative of binary zero and a black band being indicative of a binary one. The numbers are defined only in the areas above the black bands on the synchronisation track and not in the areas below the white bands in between. The date recorded on the plate is decoded as shown in FIG. XI.

The areas indicated as A and B at each end of the plate (FIG. IX) are synchronisation words. If the plate is being read from left to right, sync word A is binary number No. 0001 and, if the plate is being read from right to left, sync word B is 0001 also. This word serves to identify the start of the message. The bits C and D are direction indicators. If a binary 1 follows directly after the sync word, this indicates that the plate is being read from left to right. If an 0 follows the sync word is being read from right to left. The area E has recorded thereon the actual captive pallet number consisting of a 4 digit binary code decimal number. From FIG. IX, it will be seen that the captive pallet identified by the particular coding on the plate is No. 9741. It will be appreciated that the captive pallet identification has been described by way of example only and any means may be provided for identifying the captive pallets. Instead of providing black and white bands as in FIG. IX the coding may be produced by reflectors such as the so-called "cats eye" reflectors.

What I claim as my invention is:

1. A load storage and retrieval system including:

A. at least one load transporting route;

B. at least one load storage unit having N storage locations which are formed within a rectangular area accessable from at least two of said load transporting routes;

C. at least N movable supporting members which are arranged in a series of at least two parallel rows;

D. means for circulating said movable load supporting members in a step-by-step sequential manner either clockwise or anti-clockwise, movable in a direction parallel to one axis of said at least one load storage unit, and movable in a direction normal to said axis on carrier members which move simultaneously along said at least one load transporting route on opposite sides of said rectangular area, in either opposite directions to one another or simultaneously in one direction from right to left or left to right, each of said carrier members having the means of imparting lineal movement for any required distance along the load transporting route or one movement at a time in either direction to act as a shuttle for circulating the movable load supporting members with all of said at least one load transporting routes being on one level together with said movable load supporting members with one or more levels as required, with the carrier members also having the means of imparting transverse motion along and back two parallel rows or a series of two parallel rows on one level as a self contained complete operation, or with a series of levels acting independently, there being a total of Y said carrier members, and a maximum of N + Y − 1 of said at least N movable load supporting members, the carrier members in every case engaging with a series of equally spaced co-operating members on the floor of each level, such co-operating members being composed of open ended channels and therebeing also open ended channnel one at each corner of each said N movable load supporting member, whereby transverse movement is imparted to one or more of said N movable load supporting members in a row, one at a time, or simultaneously, or where a movable load supporting member sitting astride said carrier member in "piggy-back" fashion is used to push a whole row forward one space at a time in one direction or the other, or two rows at a time moving in opposite directions, but simultaneously; said carrier members performing the dual function of acting as shuttle carriers to circulate said at least N movable load supporting members from side to side one space or move along and back a load supporting route to any one of a series of adjoining rows, working in parallel; said carrier members being reciprocable along said at least one load transporting route extending in a direction normal to one axis at each end of said rectangular area, each of said carrier members being reciprocable simultaneously along said at least one load transporting routes in opposite directions to one another, or together simultaneously from one row to another by a distance substantially equivalent to the width of a row of storage locations, so as to be aligned alternatively with said parallel rows of movable load supporting members, the arrangement being such that the transfer of a load by any movable load supporting member, to or from said at least one load transporting route, respectively from or to a selected storage location is effected by circulatory movement of the movable load supporting members in conjunction with reciprocatory movement of the carrier members; there being at least one carrier member in each load transporting route and said carrier member being at least twice the width of a movable load supporting member, with integral means of imparting both lineal and transverse travel, with positive and precise indexing in lineal and transverse directions by mechanical means; said movable load supporting members travelling within one or more series of double rows, and never leaving this area until the desired movable load supporting member is required for unloading at a loading and unloading station;

E. locking means for each said row of load storage positions adapted to restrain at least the movable load supporting members at each end thereof against movement along the guideways of said rows;

F. means for releasing said locking means of a given row in respect to at least the movable load supporting member at the adjacent end of said row in response to the movement of a driven carrier member into registry with said adjacent end of said row; and G. control means for the driven means for said driven carrier members for imposing thereon a selected program of synchronized sequential movements arranged to insert loads presented at a loading position into storage in said load storage positions and to present loads in said load storage positions at a selected one of said unloading stations for removal from said storage unit.

* * * * *